March 19, 1935.　　　J. DE LA CIERVA　　　1,994,465
AIRCRAFT WITH ROTATIVELY MOUNTED SUSTAINING WINGS
Filed May 31, 1932　　　4 Sheets-Sheet 1
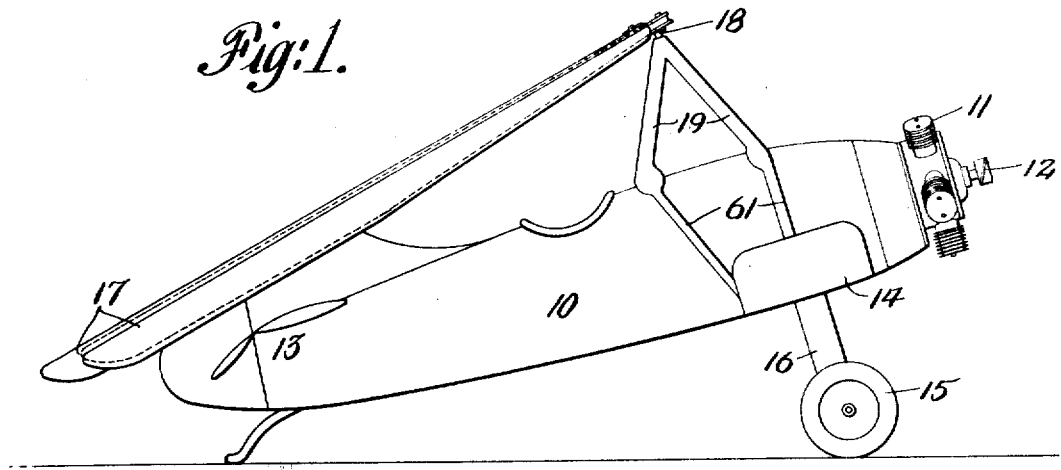
Fig:1.
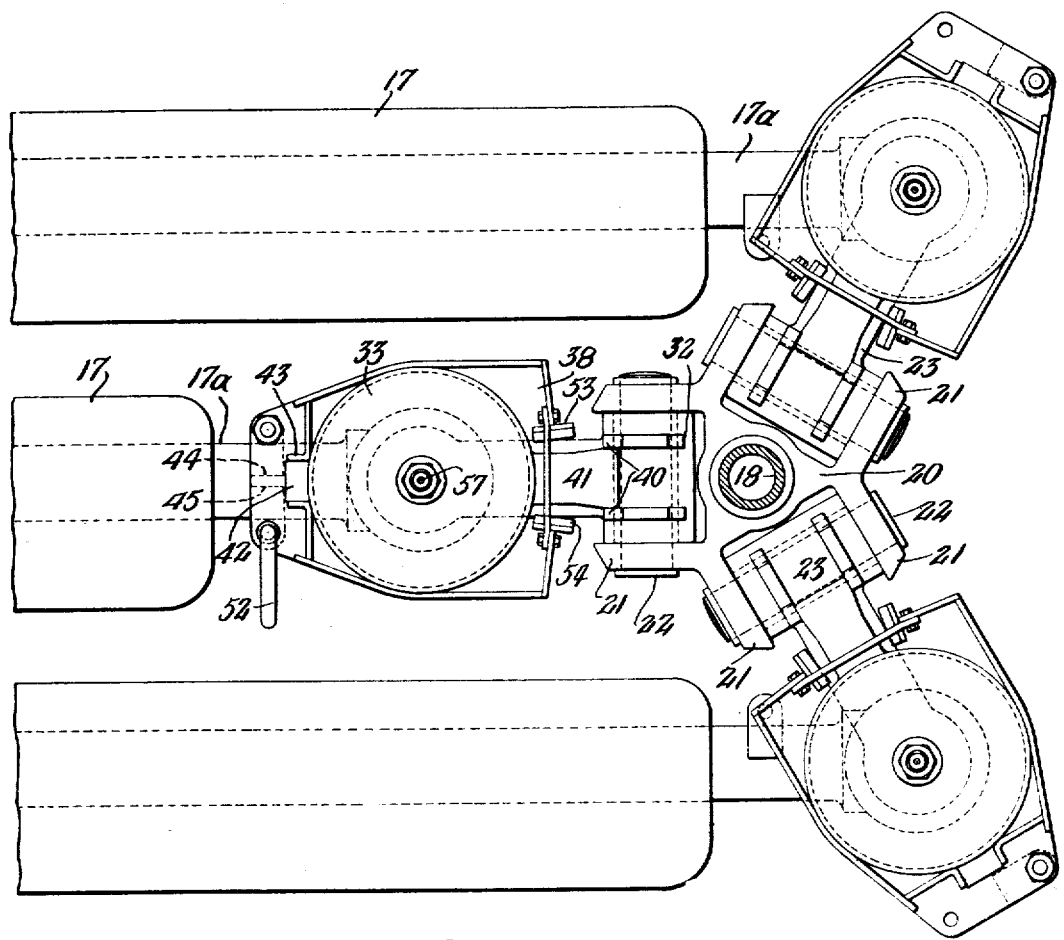
Fig:2.
INVENTOR
Juan de la Cierva
BY
Synnestvedt + Lechner
ATTORNEYS

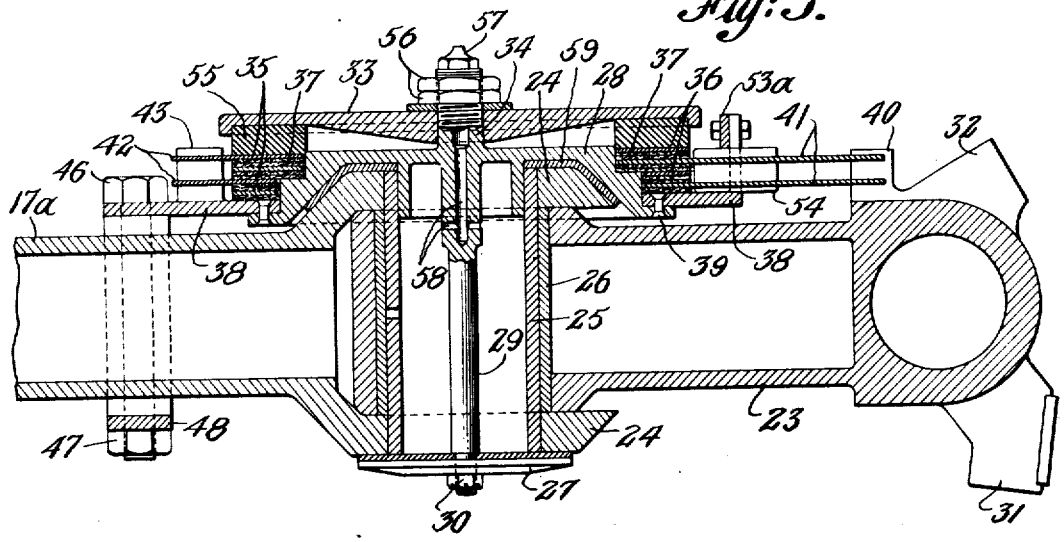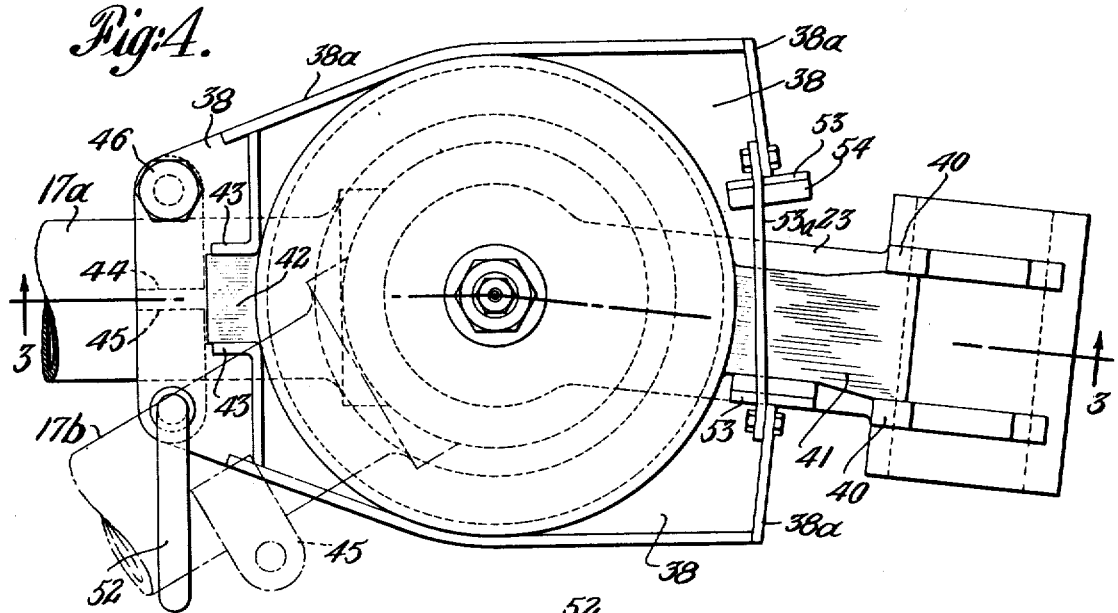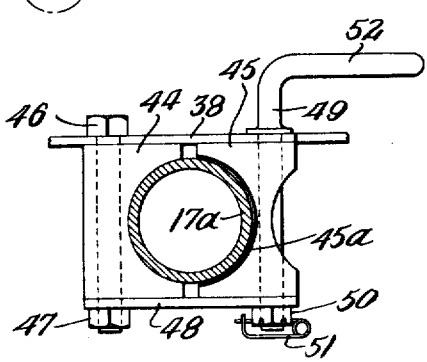

March 19, 1935. J. DE LA CIERVA 1,994,465
AIRCRAFT WITH ROTATIVELY MOUNTED SUSTAINING WINGS
Filed May 31, 1932 4 Sheets-Sheet 3
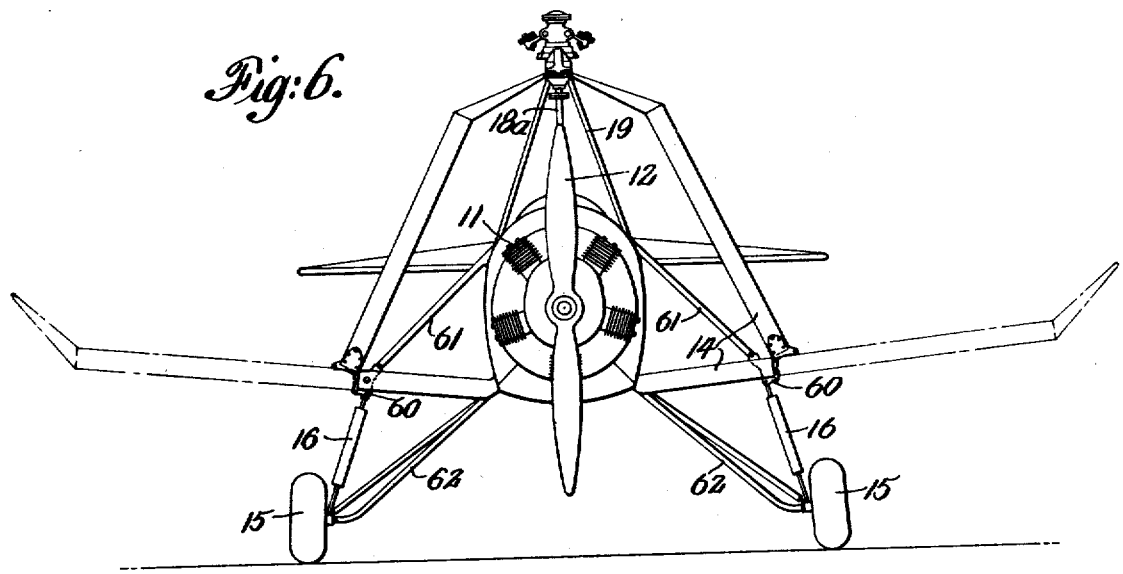
Fig: 6.
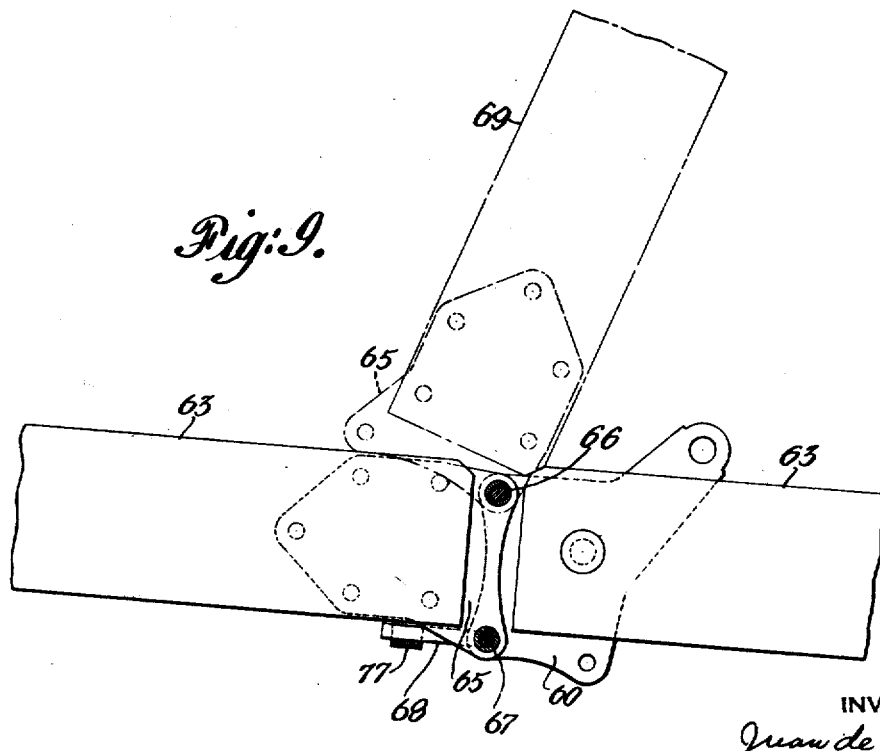
Fig: 9.
INVENTOR
Juan de la Cierva
BY
Synnestvedt + Lechner
ATTORNEYS

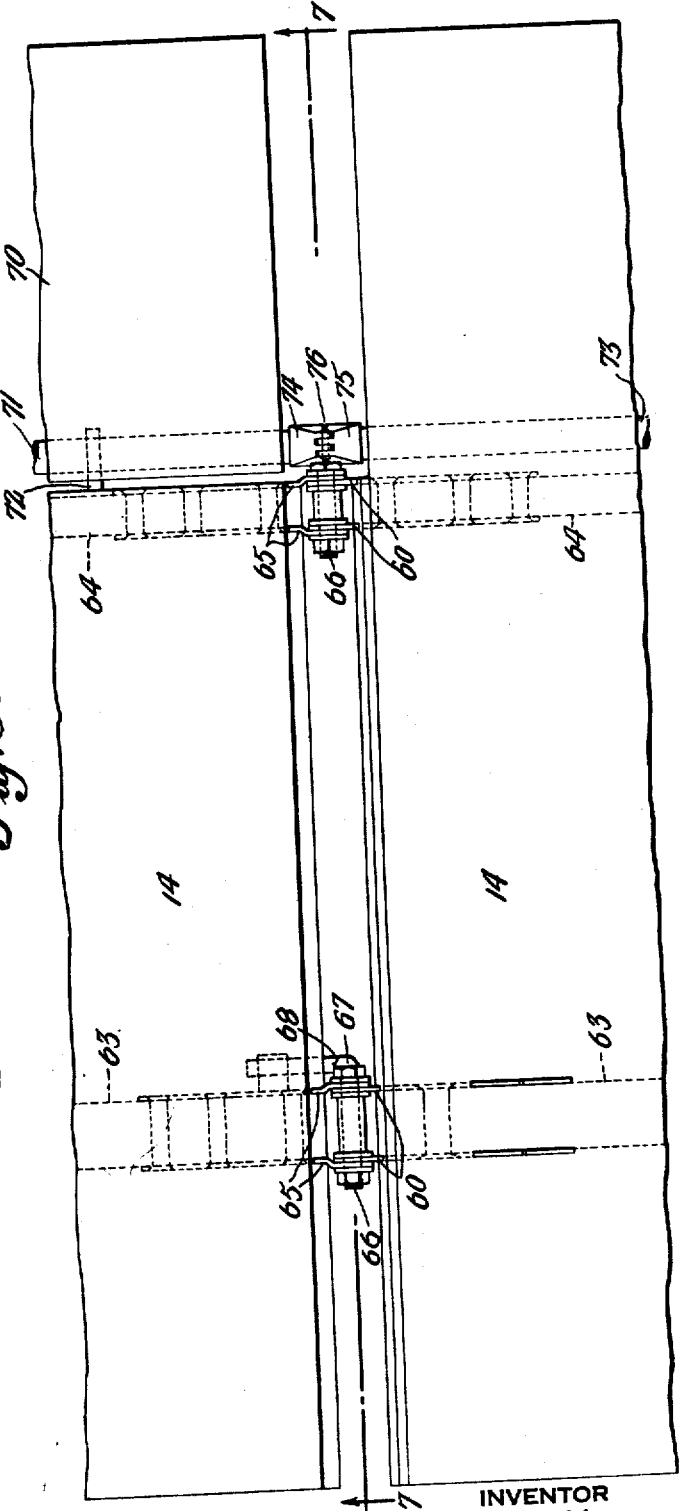

Patented Mar. 19, 1935

1,994,465

UNITED STATES PATENT OFFICE 1,994,465

AIRCRAFT WITH ROTATIVELY MOUNTED SUSTAINING WINGS

Juan de la Cierva, Madrid, Spain, assignor to Autogiro Company of America, Philadelphia, Pa., a corporation of Delaware Application May 31, 1932, Serial No. 614,475
In Great Britain June 15, 1931

13 Claims. (Cl. 244—19)

The present invention relates to aircraft of the type having, as a primary means of sustension, a system of rotatively mounted sustaining blades or wings arranged for normally free rotation under the influence of relative air flow and pivoted or articulated to a central hub structure, the blades themselves thus being free to swing individually generally within as well as transversely of the mean rotative path of travel.

One important general object of this invention is involved in the provision of a novel construction which provides for folding of the rotor blades or wings for purposes of storage in a relatively small space.

Craft of this general type may also be equipped with supplementary normally fixed lifting surfaces or wings and the invention also has in view provision of normally fixed wing structures which may readily be folded. Thus, the craft, even though equipped with rotary as well as fixed sustaining wings, may conveniently be stored in a small size hangar or garage.

Before considering some of the more or less detailed objects and advantages, it should be noted that the present invention involves certain improvements over prior structures as shown, for example, in the copending application of Harris S. Campbell, Serial No. 528,538, filed April 8th, 1931.

In addition to the foregoing general objects and advantages, this invention has in view the provision of means for folding the blades or wings of the rotor generally longitudinally of the body of the craft regardless of the number of blades incorporated in the rotor. Still further, the arrangements for folding the normally fixed lifting surfaces, in such craft as may be equipped therewith, is such as to provide a very compact total structure when all wings are folded.

Specifically, the invention also has in view the provision of novel means for folding the normally fixed wings upwardly at the sides of the craft, the joints from which these wings are adapted to fold being so located that the outer wing tips when folded upwardly and inwardly may abut and rest against the supporting structure for the rotor mount.

In considering a still further object of this invention, it should first be noted that aircraft of this general type are desirably equipped with alighting mechanism or landing gear of relatively wide tread. To support and brace such landing gear it is also convenient to employ landing gear elements (such as shock absorbers) connected to the under side of the normally fixed lifting surfaces at points spaced outwardly from the body of the craft. This invention makes provision for rigid support of the points to which the shock absorbers or other elements of the landing gear may be connected and for folding of the portions of the fixed wings which extend outwardly beyond the points referred to. Thus the width of the machine may be reduced, by upward folding of the fixed wings, to a dimension no greater, or even less, than the width of the undercarriage.

As a further object, this invention contemplates a novel means for permitting folding of the fixed wings without disturbing the operating connections which are extended outwardly through the wings to aileron surfaces carried thereby.

The pivot or joint means by which the individual blades or wings of the rotor are provided freedom for swinging movements within as well as transversely of their general path of rotative travel, ordinarily include pivot joints having substantially vertically extending axes, and it is an object of the present invention to utilize these vertical pivot joints as a means of folding the blades to a position in which they all extend in one direction from the rotor mount to overlie the body of the craft in a group.

A further object of the invention will appear more clearly if it be borne in mind that, during normal flight operation, it is desirable to limit as well as yieldingly control blade movements about their substantially upright pivots. According to a feature of this invention, stop means for limiting pivotal blade movement, as well as means for cushioning such movement are associated with the joint parts providing the upright pivot axis referred to, and readily removable and replaceable locking means are provided, so as to disconnect or release the blade from the action of the movement limiting and control devices and thus permit the blade to be swung through a relatively large angle about its upright pivot joint. By associating the movement controlling devices with the upright pivot itself, and further by utilizing this upright pivot as the means to effect folding of the rotor, the number, weight and size of parts is materially reduced, this being of especial importance, since it reduces skin friction, parasite drag and the like, all of which impair the efficiency of the rotor.

Another point to be considered in connection with the foregoing is the fact that the arrangement of this invention may effectively be employed where the rotor includes only three blades or wings. When the structure of the present invention is incorporated in a three-bladed rotor, all the blades may readily and conveniently be brought into substantial parallelism and arranged in a fore and aft position extending rearwardly from the hub.

The foregoing together with other objects and advantages will appear more clearly from the following description making specific reference to the accompanying drawings, in which—

Figure 1 is a somewhat diagrammatic side view of an aircraft of the type above referred to, the rotor blades being folded in accordance with this invention;

Figure 2 is a considerably enlarged top plan view of the rotor hub structure and portions of the blades or wings attached thereto, the blades also being folded as viewed in this figure;

Figure 3 is a vertical sectional view, taken substantially on the section line 3—3 of Figure 4, of the root end of a blade constructed and mounted in accordance with this invention, this view also showing certain portions of a blade movement controlling mechanism;

Figure 4 is a plan view of the portions of the structure illustrated in Figure 3;

Figure 5 illustrates certain details of the arrangement shown in Figures 3 and 4;

Figure 6 is a front elevational view of the machine shown in Figure 1, the view illustrating the manner of folding the normally fixed or supplemental lifting surfaces;

Figure 7 is a vertical sectional view taken substantially along the line 7—7 of Figure 8 and illustrating certain joint parts which are employed for folding the fixed wings;

Figure 8 is a top plan view of portions of a fixed wing and its associated aileron, this view also illustrating the hinge joint arrangements; and Figure 9 is a view showing certain details of a fixed wing hinge joint.

Referring first to Figure 1, the craft therein illustrated includes a body or fuselage 10 having engine and propeller 11—12 at the forward end thereof and suitable empennage surfaces 13 toward the rear. The craft illustrated is also equipped with relatively small fixed lifting surfaces 14 under which the landing gear, including wheels 15 and shock absorbers 16, is arranged. The rotor, in this instance a three-bladed rotor, includes blades 17 mounted on axis structure generally indicated at 18, this axis structure being conveniently supported above the body of the craft as by means of pylon legs or posts 19.

The craft may also be equipped with a rotor driving or starter mechanism including a shaft 18a (see Figure 6) extended upwardly from the engine 11 to the rotor hub.

As seen in Figure 2, the axis member 18 serves to support a hub structure 20 provided with three pairs of lugs or jaws 21 carrying hinge pins 22 preferably extended in a substantially horizontal plane or perpendicular to the axis member 18. Each blade 17 is equipped with a link member 23 which fits between a pair of lugs 21 and which is apertured to receive a horizontal pivot pin 22. This structure, therefore, permits freedom for movement of the blades generally transverse to their rotative path of travel.

In order to support the blades as against excessive drooping when they are inactive or not rotating at flight speeds, I prefer to provide each link 23 with an abutment or stop 31 (see Figure 3) which may conveniently be positioned to react against the axis member 18 illustrated in Figures 1 and 2. The link or block 23 may further be equipped with an additional stop 32 provided for the purpose of limiting excessive upward movement of the blades in a manner similar to that described for abutment 31.

The main longitudinal spar member 17a of each wing (see Figures 2, 3 and 4 particularly) is forked as indicated at 24 to embrace the outer end of its associated link or block member 23, and a substantially upright pivot pin 25, having a surrounding floating bushing 26, serves to pivotally unite the fork 24—24 with the link 23. As clearly seen in Figure 3, the vertical pivot pin 25 is retained or fastened in place between a washer or cap 27 and a member 28 having a central spindle 29 carrying a securing nut 30.

The mechanism for controlling relative rotation of the blade spar 17a and the joint part 23 includes a plate-like element or disc 33 positioned and mounted by means of an upward extension 34 of member 28. This disc 33 cooperates with shouldered portions of the member 28 to receive friction discs 35 and 36. These discs are arranged in interleaving fashion and are equipped with friction lining or the like 37. Supported on member 28 just below the friction elements 35, 36 and 37 an additional plate-like member 38 is inserted and preferably secured to the member 28 as by means of rivets or bolts 39.

The link or block 23 is provided with spaced abutments 40 adjacent the inner end thereof for positioning the lips or extensions 41 of the friction discs 36. These discs 36, therefore, move with the link 23.

Similarly, the discs 35 are provided with extensions 42 which are received between spaced abutments 43 carried on plate member 38. Thus, friction discs 35 move with the plate 38 and, during normal flight operation, this plate is secured to the blade spar 17a by means of bracket members or blocks 44 and 45 having semi-circular recesses adapted to embrace the spar. The bracket member 44 is secured to the plate 38 as by the bolt 46, this bolt being provided with a nut 47 which also serves as a means of attachment for a tie member 48. On the other hand, the bracket member 45 is preferably attached to the blade spar 17a itself, for example, by welding indicated at 45a, and this member is apertured to pass the pin 49 (see Figure 5) having a securing nut 50 held as against displacement by spring clip 51. Pin 49 is also preferably equipped with a handle 52 provided for convenience of removal. From the foregoing, it will be seen that in normal operation the plate member 38, and thus the friction discs 35, are rigidly secured to the blade spar 17a.

Plate member 38 also carries spaced stop members 53 arranged at opposite sides of the tongues or lips 41 extended from friction discs 36. The abutments or stops 53 may conveniently be equipped with small rubber bumpers 54 and the spacing of these parts is such as to permit some relative rotation of the plate member 38 and the link 23 but to limit such moveemnt to the desired angular degree. Tie member 53a, connected with stiffening ribs 38a of plate 38, serves to brace the stops 53.

The foregoing structure, therefore, serves not only to yieldingly resist blade movements about the pivot pin 25 but also to predeterminedly limit such movements. As a further feature, an annular block of rubber such as shown at 55 is preferably inserted between the disc 33 and the upper friction ring 35 (this being clearly illustrated in Figure 3) and in order to adjust the reaction of the blade movement controlling device, suitable lock nuts 56 are threaded on to the spindle 34 so as to permit adjustment of the pressure with which the discs and friction material contact with each other.

Lubrication of the vertical pivot pin 25 may be had as by means of a fitting 57 communicating through passages 58 with the interior of the pivot pin 25 from which the lubricant may be delivered to the bearing surfaces of bushing 26, for example, through suitable apertures or grooves.

When it is desired to fold the rotor blades to the positions indicated, for example, in Figures 1 and 2, the rotor is preferably position so that one blade thereof extends rearwardly directly from the supporting axis and hub structure (this blade being the central blade in Figure 2) and the removable locking pins or devices 52 for the other two blades are removed. This permits swinging of the two remaining blades, about their vertical pivot pins 25, through a relatively large angle so as to bring them back, as shown in Figures 1 and 2, to positions in which they lie substantially parallel to the central blade 17. Thus, by the mere removal of a single locking device, the friction damper as well as the abutments for limiting blade movement are both disconnected so that substantially no resistance to the desired folding movement remains. However, in order to prevent free rotation of a blade, during a folding operation, under the influence of gravity or a wind, I prefer to interpose a washer or the like of friction material between the upper blade fork 24 and the lower side of member 28, this being clearly illustrated in Figure 3 by the reference numeral 59. This friction washer, of course, performs no function in normal operation but is merely provided, as above noted, to prevent undesired swinging of a blade upon removal of the locking pin 52. The frictional effect of this washer 59 may readily be overcome by hand in rotating the blade to the desired position. It might also be noted at this point that, in Figure 4, in addition to the full line showing of the blade spar 17a, a dot and dash line showing 17b is included to indicate the manner in which movement may be effected upon removal of the locking pin 52. This also shows a bracket or block member 45 as being carried with the spar.

Turning now more particularly to the showing of Figures 6 to 9 inclusive, attention is first called to the fact that the shock absorbers 16 of the landing gear are extended upwardly from the wheels 15 to be connected with fittings 60 located on the fixed wings a short distance away from the fuselage, while landing gear struts 62 are pivoted to a fixed portion of the craft preferably on the body or at least closely adjacent thereto. These fittings 60 also serve as attachment means for the wing braces or struts 61 and, as will now appear, the elements 60 still further serve a third purpose which is involved in folding the fixed wings.

As best seen in Figures 7, 8 and 9, each fixed wing includes a main and forward spar 63 as well as a somewhat smaller rear spar 64. These spars are both broken at a point just adjacent the fittings 60, i. e., at some distance from the body of the craft and, in addition to the plate members 60 with which the inner portions of the spars are equipped, the outer portions of the spars are provided with similar plates 65. Plates 60 and 65 cooperate in pairs to receive bolts 66 and removable securing pins 67.

In the preferred arrangement, the bolts 66 serve as pivot pins for movement of the wing about an axis extended substantially parallel to the chord line thereof. Pins 67 are preferably provided with handles 68 for convenience in manipulation, and upon removal of the pins 67 the wings may be swung upwardly from their normal flight position to the position indicated in full lines in Figure 6. Figure 9 shows adjacent portions of a wing spar in full lines, in normal flight position, and in dot and dash lines (see reference numeral 69) in folded position. If desired, spring clips such as shown at 77, cooperating with handles 68, may also be provided in order to prevent unintentional rotation and displacement of the removable locking pins 67.

Another point to be considered in connection with folding of the fixed wings is the arrangement provided for operating the ailerons. As seen in Figures 7 and 8, the aileron 70 is pivotally mounted to rotate with shaft 71 as by means of apertured brackets 72. An additional operating member 73 for the aileron is preferably extended inwardly through the wing as clearly seen in Figure 8, and the two shafts 71 and 73 are coupled to each other by means of joint parts 74 and 75 which, as seen in both Figures 7 and 8, are pivotally united by a pin 76 arranged axially of the pivot bolts 66.

It will be apparent, of course, that normal aileron control may be had by suitably connecting the torque tubes 73 with the operator's control in the body of the craft, it being necessary only to rotate this tube in order to effect usual aileron operation. It will further be apparent that when it is desired to fold the fixed wings this may readily be accomplished without in any way disturbing the actuating connections for the ailerons. By terminating each aileron, at its inner end, adjacent to the point of pivotation of the two portions of the wing, therefore, and by utilizing a jointed torque tube of the character just described, it is unnecessary to provide a disconnectible joint in the aileron control.

The foregoing fixed wing folding arrangement, including the means by which normal control of the ailerons is provided without necessitating separation, for folding purposes, is of especial advantage in view of its extreme simplicity while maintaining ruggedness and rigidity for flight operation, especially with respect to aileron control.

A still further advantageous feature of the entire structure above considered is involved in the novel manner in which the foldable rotary and fixed wings cooperate to permit reduction in the overall dimensions of the machine. This will be apparent from inspection of Figures 1 and 6 particularly, although it might be noted that in Figure 6 the rotor blades have been omitted for the sake of clarity in the drawings. Thus, when all wings are folded, the rotor blades substantially parallel each other and extend rearwardly from the supporting hub, and the fixed wings swing upwardly and inwardly to positions in which they lie substantially parallel to the pylon legs.

While, in accordance with this invention, secure and positive locking means are provided so as to ensure proper action of the blade movement controlling and limiting devices in flight, at the same time, the locking devices may readily and conveniently be removed in a minimum of time. This removal provides for complete disconnection of the blade movement control and limiting devices with the result that manual displacement of the blades, from their normal operating positions to their folded positions, is substantially unimpeded.

From the foregoing still another feature of considerable importance should be apparent, i. e., that a minimum number, size and weight of parts is employed in the structure providing for folding of the rotor blades. The simplicity resulting is at least in large measure due to the utilization, for folding purposes, of the substantially vertical pivot pin normally provided for blade movements in flight, and also by the use of only three blades in the rotor and by total elimination of interblade and droop cables heretofore employed.

I claim:—

1. In an aircraft, a sustaining rotor including a common axis structure, sustaining blades or wings mounted to rotate about the axis structure, pivot means for the blades arranged to provide freedom for force-compensating blade movements of each blade substantially independently of the other blades in flight, said pivot means being positioned to serve also as a means to provide freedom for blade folding movements when the rotor is at rest, and releasable means located adjacent the axis structure and arranged to prevent unintentional folding movements of the blades on said pivot means.

2. In an aircraft, a sustaining rotor including a common axis structure, sustaining blades or wings mounted to rotate about the axis structure, a substantially upright pivot pin for each blade serving as a means to provide freedom for force-compensating blade movements in flight and positioned to serve also as a means to provide freedom for blade folding movements when the rotor is at rest, and a readily releasable device associated with the wings adjacent the pivots therefor normally restricting blade folding movements.

3. In an aircraft, a rotary sustaining system including a generally upright axis structure, sustaining blades mounted to rotate about the axis structure, a generally upright pivot pin connecting each blade to the axis structure for permitting blade movements, during flight operation, generally within the rotative path of travel, said pins further serving to permit relatively great pivotal blade movement for folding purposes, and means closely associated with the wing pivots for controlling pivotal blade movements on said pins in flight.

4. In an aircraft sustaining rotor, a hub structure, a sustaining blade, a pivot interconnecting them, and a rotationally reacting friction blade movement controlling device associated with said pivot.

5. In an aircraft sustaining rotor, a central mounting or hub structure, a rotor blade or wing attached to said structure on a substantially upright pivot joint, means reacting between pivot joint parts at opposite sides of the pivot axis for restricting blade pivotal movements, and manually operable means for providing substantially unrestricted blade pivotal movement about the pivot axis.

6. In an aircraft sustaining rotor, a central hub and mounting structure, a sustaining blade, a pivot joint for attaching the blade to said structure including a substantially upright pivot pin, means for yieldingly resisting pivotal blade movements about said pin including a movement damping device connected to and reacting between joint parts at opposite sides of said pin, and means for disconnecting said damping device at least at one side of said pin, whereby to permit substantially unrestricted blade movement about the pin, to facilitate folding of the rotor for storage purposes.

7. In an aircraft sustaining rotor, a central mounting or hub structure, a rotor blade or wing attached to said structure on a substantially upright pivot joint, means reacting between pivot joint parts at opposite sides of the pivot axis for yieldingly resisting pivotal blade movements, means for limiting pivotal blade movements, and means operable at will to provide substantially unrestricted pivotal blade movement, about said pivot axis, beyond the limits imposed by the limiting means.

8. In an aircraft sustaining rotor, a central hub and mounting structure, a sustaining blade, a pivot joint part connected with said structure, a substantially upright pivot pin for connecting the blade and said part, means for controlling relative rotation of said part and the blade about said pivot pin including a rotationally reactive damping device arranged axially of the pivot pin and provided with reaction connections with said joint part and said blade, and means for disconnecting one of said connections, whereby to permit substantially unrestricted relative rotation of the joint part and the blade.

9. In an aircraft sustaining rotor, a central hub and mounting structure, a sustaining blade, a pivot joint part connected with said structure, a substantially upright pivot pin for connecting the blade and said part, means for controlling relative rotation of said part and the blade about said pivot pin including a rotationally reactive damping device arranged axially of the pivot pin and provided with reaction connections with said joint part and said blade, spaced stop means connected and movable with said joint part and the blade for limiting relative pivotal movement thereof, and a readily removable locking device operative to disconnect the stop means and the damping device, whereby to permit substantially unrestricted relative rotation of the joint part and the blade beyond the limits imposed by the stop means.

10. In an aircraft sustaining rotor, a central hub and mounting structure, a sustaining blade, a pivot joint part connected with said structure, a substantially upright pivot pin for connecting the blade and said part, means for resisting relative rotation of said part and the blade about said pivot pin having connection with the joint part and with the blade to react therebetween, spaced stop means connected and movable with said joint part and the blade for limiting relative pivotal movement thereof, and a readily removable locking device operative to disconnect the stop means and the resistive means, whereby to permit substantially unrestricted relative rotation of the joint part and the blade beyond the limits imposed by the stop means.

11. In an aircraft sustaining rotor, a central mounting or hub structure, a rotor blade or wing pivotally jointed to said hub structure, means reacting between pivot joint parts at opposite sides of the pivot axis for restricting pivotal blade movements, and manually operable means for providing substantially unrestricted pivotal blade movement about the pivot axis.

12. An aircraft including two systems of foldable sustaining surfaces, one system being of the rotative blade or wing type and being provided with a mounting structure projecting above the body of the craft, and the other system being of the fixed wing type projecting laterally from the body of the craft below the rotative system, pivot parts for mounting the blades of the rotative system with freedom for folding of the blades by pivotal movement on said parts to bring the several blades of the rotor system into approximate parallelism, and pivot means incorporated in the mounting structure for the fixed wing system constructed and arranged to provide for folding thereof by upward pivotal movement in a plane generally perpendicular to the plane of folding of the rotor blades, the two sustaining systems being relatively vertically positioned and the pivot means for the fixed sustaining system being so located longitudinally of the fixed wings as to provide for folding movement of the fixed wings to a position in which the fixed wing tips abut against the mounting structure for the rotative system at a point below the general plane of said rotor system, whereby the rotor mount serves as a support for the fixed wings when folded.

13. In an aircraft sustaining rotor, a central mounting or hub structure, rotative blades or wings each attached to said structure on a substantially upright pivot joint providing for force compensating movements of the wings in flight and for folding movements of the wings when the rotor is at rest, and separate releasable means for each wing arranged to prevent unintentional folding movement of the wings on their pivot joints.

JUAN DE LA CIERVA.